(12) United States Patent
Upadhyay et al.

(10) Patent No.: US 8,671,080 B1
(45) Date of Patent: *Mar. 11, 2014

(54) SYSTEM AND METHOD FOR MANAGING DATA LOSS DUE TO POLICY VIOLATIONS IN TEMPORARY FILES

(75) Inventors: Rajesh Upadhyay, Newark, CA (US); Dirk Kessler, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 13/168,929

(22) Filed: Jun. 24, 2011

Related U.S. Application Data

(63) Continuation of application No. 12/404,103, filed on Mar. 13, 2009, now Pat. No. 7,991,747.

(60) Provisional application No. 61/098,207, filed on Sep. 18, 2008.

(51) Int. Cl.
*G06F 17/30* (2006.01)

(52) U.S. Cl.
USPC ............. 707/674; 707/821; 726/22; 726/26; 713/156

(58) Field of Classification Search
USPC .............. 707/674, 821; 709/225, 224, 250; 726/1, 22, 26; 713/156
See application file for complete search history.

(56) References Cited

U.S. PATENT DOCUMENTS

| | | | |
|---|---|---|---|
| 7,769,731 B2 * | 8/2010 | O'Brien | 707/694 |
| 7,814,021 B2 * | 10/2010 | Stamos et al. | 705/57 |
| 7,991,747 B1 * | 8/2011 | Upadhyay et al. | 707/674 |
| 7,996,373 B1 * | 8/2011 | Zoppas et al. | 707/694 |
| 7,996,374 B1 * | 8/2011 | Jones et al. | 707/694 |
| 8,060,596 B1 * | 11/2011 | Wootton et al. | 709/223 |
| 8,224,796 B1 * | 7/2012 | Shinde et al. | 707/695 |
| 8,286,255 B2 * | 10/2012 | Grant et al. | 726/27 |
| 8,291,498 B1 * | 10/2012 | Liang et al. | 726/24 |
| 8,312,553 B2 * | 11/2012 | Rowney et al. | 726/26 |
| 8,321,560 B1 * | 11/2012 | Pai et al. | 709/224 |
| 8,341,734 B1 * | 12/2012 | Hernacki et al. | 726/21 |
| 8,392,379 B2 * | 3/2013 | Lee | 707/687 |
| 8,468,244 B2 * | 6/2013 | Redlich et al. | 709/225 |
| 2005/0060537 A1 * | 3/2005 | Stamos et al. | 713/156 |
| 2005/0257567 A1 * | 11/2005 | Bondanza | 63/15.1 |
| 2008/0082377 A1 | 4/2008 | Kennis et al. | |
| 2008/0086513 A1 * | 4/2008 | O'Brien | 707/200 |
| 2008/0301757 A1 * | 12/2008 | Demarest et al. | 726/1 |
| 2009/0024674 A1 | 1/2009 | Gallagher | |
| 2009/0038010 A1 | 2/2009 | Ma et al. | |
| 2009/0086252 A1 * | 4/2009 | Zucker et al. | 358/1.14 |
| 2009/0113526 A1 * | 4/2009 | Werner et al. | 726/4 |
| 2009/0144545 A1 * | 6/2009 | Dhuvur et al. | 713/165 |
| 2010/0162347 A1 * | 6/2010 | Barile | 726/1 |
| 2013/0179947 A1 * | 7/2013 | Kline et al. | 726/4 |

* cited by examiner

*Primary Examiner* — Jean M Corrielus

(74) *Attorney, Agent, or Firm* — Lowenstein Sandler LLP

(57) ABSTRACT

A method and apparatus for managing data loss due to policy violations in temporary files is described. In one embodiment, the method includes monitoring, by a client agent, information content on a client for violations of a policy. The method further includes determining, by the client agent, that a violation of the policy has occurred for content of a temporary file of an application. In one embodiment, the policy violation of the temporary file is correlated, by the client agent, with an original file of the application.

16 Claims, 7 Drawing Sheets

SYSTEM AND METHOD FOR MANAGING DATA LOSS DUE TO POLICY VIOLATIONS IN TEMPORARY FILES

RELATED APPLICATIONS

This application is a continuation of U.S. patent application Ser. No. 12/404,103, now U.S. Pat. No. 7,991,747, filed Mar. 13, 2009, which claims the benefit of U.S. Provisional No. 61/098,207, filed Sep. 18, 2008, and which is incorporated herein by reference.

FIELD OF INVENTION

Embodiments of the invention relate to the field of processing data, and more particularly, to correlating data loss prevention policy violations detected for temporary application files with associated application files.

BACKGROUND OF THE INVENTION

Data Loss Prevention (DLP) involves computer and information security, where DLP systems identify, monitor, and protect data in use (e.g., endpoint actions), data in motion (e.g., network actions), and data at rest (e.g., data storage). DLP systems may be deployed at user endpoint devices, network servers, etc. to inspect information content. DLP systems are designed to detect and prevent the unauthorized use and transmission of confidential information.

Client computer systems and devices, such as personal computers, laptop computers, personal digital assistants, smart phones, etc. are prolific in modern organizations. Often these systems include applications that allow users to create and edit documents, spreadsheets, presentations, databases, etc, which are referred to collectively as "documents."

When a user edits a document in an application, such as an MSOFFICE™ document edited in MSWORD™, the application creates a temporary application file in the background. The temporary application file is utilized by the application to protect the user from data loss due to an abnormal termination of the application. That is, the temporary application file may be used to recover new/edited content from the temporary file to prevent users from losing prior work.

This behavior of productivity and office applications interferes with real-time data loss prevention systems deployed on endpoint devices. That is, every time a temporary file is written, an endpoint data loss prevention system detects the file creation. The newly created, and temporary, application file may thereafter be scanned by a data loss prevention system for data loss prevention policy violations. When a policy violation occurs, the name of the temporary file is reported in a corresponding data loss prevention incident report. However, temporary file names, such as '~wrd0394575.doc', are not based on the original file name and thus make it difficult to associate the policy violation with the original document.

SUMMARY OF THE INVENTION

A method and apparatus for managing data loss due to policy violations in temporary files is described. In one embodiment, the method includes monitoring, by a client agent, information content on a client for violations of a policy. The method further includes determining, by the client agent, that a violation of the policy has occurred for content of a temporary file of an application. In one embodiment, the policy violation of the temporary file is correlated, by the client agent, with an original file of the application.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
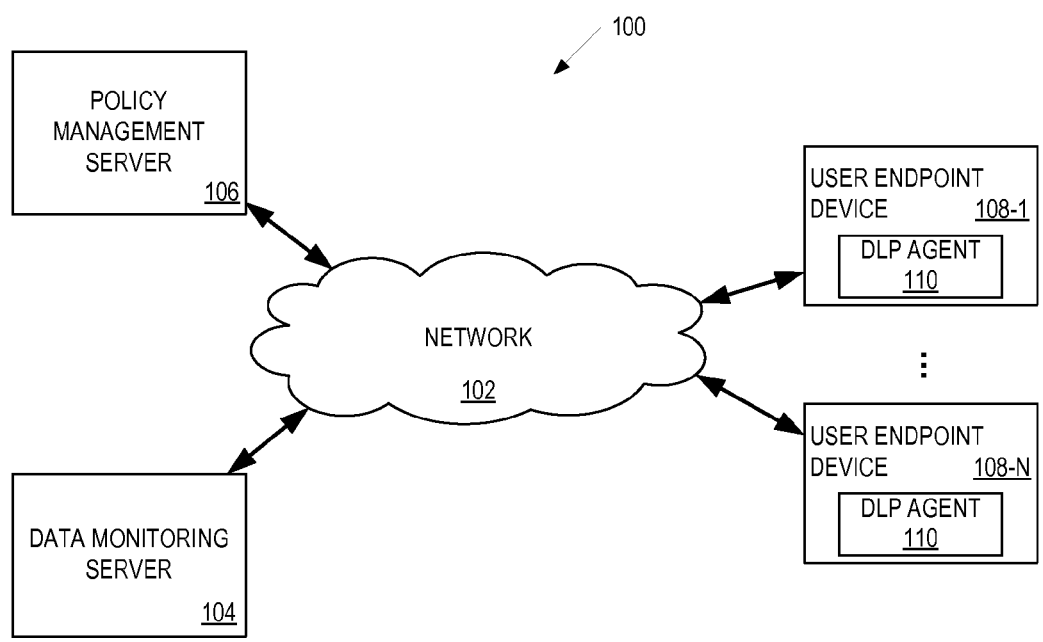
FIG. 1 is a block diagram of exemplary system architecture for managing temporary file data loss prevention policy violations.

A method and apparatus for managing data loss due to policy violations in temporary files is described. In one embodiment, the method includes monitoring, by a client agent, information content on a client for violations of a policy. The method further includes determining, by the client agent, that a violation of the policy has occurred for content of a temporary file of an application. In one embodiment, the policy violation of the temporary file is correlated, by the client agent, with an original file of the application.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of exemplary system architecture 100 for managing temporary file data loss prevention policy violations. In one embodiment, the system 100 includes a data monitoring server (DMS) 104, a policy management server (PMS) 106, and a plurality of user endpoint devices (e.g., user endpoint device 108A to 108N). The DMS 104 and the PMS 106 may reside on the same or different machines (e.g., a server computer system, a gateway, a personal computer, etc.). The DMS 104, PMS 106 and user endpoint devices may be coupled to a computer network that communicates any of the standard protocols for the exchange of information. They may run on one Local Area Network (LAN) and may be incorporated into the same physical or logical system, or different physical or logical systems.

Alternatively, the DMS 104, PMS 106, and user endpoint devices (e.g., user endpoint device 108-1 to 108-N) may reside on different LANs that may be coupled together via the Internet but separated by firewalls, routers, and/or other network devices. In yet another configuration, the PMS 104 may reside on a server, or different servers, coupled to other devices via a public network (e.g., the Internet) or a private network (e.g., LAN). It should be noted that various other network configurations can be used including, for example, hosted configurations, distributed configurations, centralized configurations, etc.

The PMS 106 is responsible for receiving parameters pertaining to data loss prevention (DLP) policies, such as preconfigured template policies or customized policies, and creating policies based on these parameters. In one embodiment, the PMS 106 receives the policy parameters via a policy definition graphical user interface (not shown). In another embodiment, the PMS 106 receives the policy parameters from an Application Programming Interface (API) or via a configuration file formatted in text or a defined data format (e.g., extensible markup language (XML) or binary format).

The PMS 106 may create policies based on regulations concerning handling of sensitive information maintained by an organization, or based on corporate data governance rules. The regulations may include, for example, the Health Insurance Portability and Accountability Act (HIPAA) ensuring the confidentiality of electronic protected health information, California Senate Bill 1 (SB1) or Senate Bill 1386 (SB1386) controlling customer information leaving the company and affiliates, the Gramm-Leach-Bliley Financial Services Modernization Act controlling customer information leaving a financial institution, the Cardholder Information Security Program (CISP) controlling handling of customer credit card information maintained by an organization, or the like. In one embodiment, the PMS 106 may use policy templates or customized policies pre-configured based on input provided by individuals familiar with the relevant regulations or corporate data governance rules.

A policy may include a set of rules that specify which information should be present in a message to trigger a violation. For example, a message may represent a transmitted document (e.g., an email message, a web mail message, etc.), a document generated by an application, or data stored in databases, caches, etc. The set of rules may provide specific conditions for triggering a violation (e.g., a sender or recipient of a message, inclusion in a message of a keyword(s) or regular expression pattern, etc.). The rules in the policy may be combined using logical connectives of first-order logic (e.g., AND, OR, NAND, NOR, NOT, equivalent, nonequivalent, or the like).

In one embodiment, a policy specifies source data that should be protected from unauthorized transmission, access or any other use. The source data may be stored in a tabular format (e.g., data in a relational database, data maintained by client/server applications built on top of relational databases, data in document and file systems that store table formatted data (e.g., CSV files or Excel spreadsheet files), etc.) or it may be stored in a non-tabular format that may be convertible to a tabular format (e.g., data stored as comma separated values in a flat file, a password database or a single-sign-on system, relational data in an object-oriented database, etc.) or may not be convertible to a tabular format (e.g., text files, etc.). The policy may also specify which portions of the source data 102 should be included in a message to trigger a policy violation.

In one embodiment, the PMS 106 creates an abstract data structure that includes signature of data elements of the source data. The signature may be an encrypted or hashed copy of the data element or some other representation of the data element that would not allow a malicious user to recover the actual content of the data element. In one embodiment, the abstract data structure also includes placement information of data elements within the source data. The placement information may include the number of a row storing the data element in the source data and/or the number of a column storing the data element in the source data. Optionally, the placement information may also include the data type of the column. The signatures and placement information may be stored in a tuple-storage structure derived from the source data. A tuple-storage structure provides a mechanism for storing multiple tuples associated with the elements of the source data. Examples of tuple-storage structures include a hash table, a vector, an array, a tree or a list. Each type of the tuple-storage structure is associated with a method for retrieving a set of tuples for any given content element (the set of tuples may be empty if no match is found in the tuple-storage structure). The abstract data structure may be created periodically and sent to the DMS 104, along with the policy that is to be implemented.

In one embodiment, the DMS 104 is responsible for monitoring information content (e.g., sent email messages, instant messages, text messages, and/or other documents according to a configuration of the DMS 104) transmitted over network 102 to detect policy violation incidents. In one embodiment, the DMS detects policy violation incidents using the policies supplied by the PMS 106 and the abstract data structure created by the PMS 106. Once the DMS 104 has detected a policy violation, the DMS 108 reports the policy violation to an appropriate entity (e.g., a manager, database administrator, a reporting system, etc.) or performs some other action.

In one embodiment, the user endpoint devices (e.g., user endpoint devices 108-1 to 108-N) assist the DMS 104 in detecting policy violations by monitoring information content locally (e.g., files and/or other documents) on the user endpoint devices 108. In one embodiment, the information content is monitored in real-time by a data loss prevention (DLP) agent 110 of the user endpoint devices 108, utilizing policies supplied by the PMS 106.

In one embodiment, user endpoint devices 108-1 to 108-N are client devices, such as, for example, personal computers, laptop computers, cellular telephones, personal digital assistants (PDAs), etc. In one embodiment, once a DLP Agent 110 has detected a policy violation, the DLP Agent 110 notifies the DMS 104, which then reports the policy violation to an appropriate entity (e.g., a manager, database administrator, a reporting system, etc.) or performs some other action.

In one embodiment, user endpoint devices 108 include applications (not shown) that generate temporary application files. For example, when an MSOFFICE™ file is edited by a user, a temporary file is created. Temporary files are typically generated automatically by productivity or office applications (e.g., word processing applications, spreadsheet applications, database applications, email applications, etc.), and reflect an edited state of a corresponding original (non-temporary) application file. When an application file is saved/closed by a user of a user endpoint device 108, the prior version of the application file is deleted, the temporary file is renamed with the corresponding non-temporary filename, and then closed. In one embodiment, DLP agents 110 monitor temporary application files for policy violations. When a policy violation occurs for a temporary file, the DLP agent 110 causes the temporary file policy violation to be reported to the appropriate entity.

However, temporary files are created with non-administrator friendly file names (e.g., ~wrd002343.doc, ~tmpfilename.doc, etc.). Thus, when a policy violation occurs with respect to a temporary file, the temporary file name (e.g., ~wrd002343.doc) is included in the generated incident report. The use of temporary file names make it difficult to determine the actual file (e.g., the corresponding non-temporary application file) involved in policy violation, an associated user, etc. Therefore, in one embodiment, DLP Agent 110 correlates the temporary application file policy violation with a name of a corresponding original application file. Because the original application file name is correlated with the temporary application file policy violation, the original application file is identified in a policy violation report when the report is transmitted to the appropriate entity.

Figure 2:
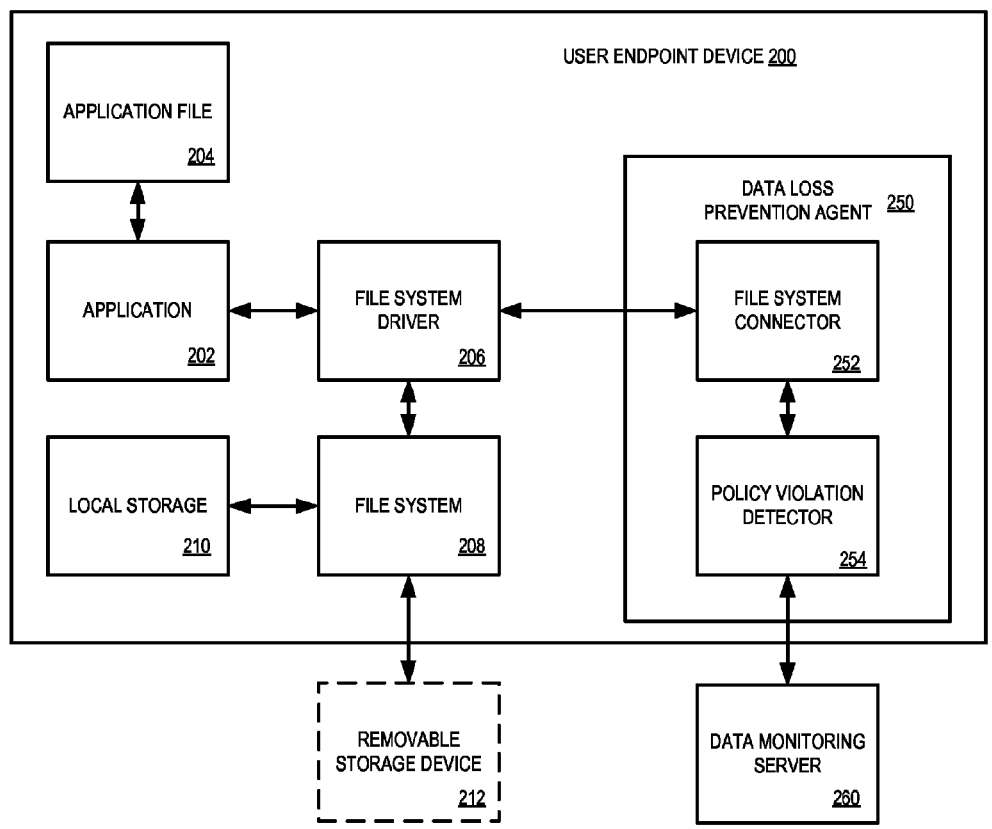
FIG. 2 is a block diagram of one embodiment of user endpoint device that includes a data loss prevention agent.

FIG. 2 is a block diagram of one embodiment of a user endpoint device 200 that includes a data loss prevention agent 250. In one embodiment, user endpoint device 200 is a client device that contains a file system 208, such as the New Technology File System (NTFS), File Allocation Table (FAT32), Network File System (NFS), etc. file system, which operates in the kernel of an operating system run on user endpoint device 200. The file system 208 is responsible for storing and organizing computer files for user endpoint device 200, as well as the data the files contain. In one embodiment, file system 208 uses local storage 210, such as a hard disk, and maintains the physical location of the files stored on local storage 210. In one embodiment, file system 208 also uses removable storage device 212, such as a flash memory device, and maintains the physical location of the files stored on removable storage device 212.

In one embodiment, file system driver 206 is running on top of the file system 208 using an application programming interface (API) of the file system 208. The file system driver 206 monitors file system operations, such as rename, create, close, read, write, etc., file system operations. In one embodiment, file system driver 206 reports monitored file system operations to DLP agent 250. Furthermore, in one embodiment, file system driver 206 receives file system instructions from DLP agent 250, such as an instruction for file system 208 to delete a file that violates a policy, and causes file system 208 to perform the associated action.

In one embodiment, user endpoint device 200 includes an application 202. In one embodiment, application 202 is a productivity or office suite application, such as an MSOFFICE™, COREL™, STAROFFICE™, etc. application. Furthermore, the application may be any of a word processing application (e.g., WORD™, WORDPERFECT™, STARWRITER™), a spreadsheet application (e.g., EXCEL™, QUATRO PRO™, STARCALC™), a presentation application (e.g., POWERPOINT™, PRESENTATIONS™, STARIMPRESS™), a database application (e.g. ACCESS™, STARBASE™), drawing applications (e.g., STARDRAW™), diagramming applications (e.g., VISIO™), etc. Application 202 enables a user to create and edit application file 204. When application 202 creates a new document or edits an existing document, Application 202 instructs the file system 208 via the file system driver 206 to create a temporary application file (not shown) in local storage 210 or removable storage device 212. As content is added to document 204, application 202 applies the edit to the temporary application file. In response to a request to close document 204, application 202 causes application file 204 to be deleted, and the temporary application file to be closed and then renamed with application file 204's original file name. As discussed above, file system driver 206 monitors the actions taken by file system 208, such as the delete, rename, and close operations, and reports the operations to DLP agent 250. In one embodiment, file system driver 206 reports all monitored file system actions to DLP agent 250. In another embodiment, file system driver 206 reports less than all actions to DLP agent 250, such as file system operations related to specific file types, files related to specific applications, etc.

In one embodiment, DLP agent 250 is responsible for the real-time monitoring and policy enforcement for content within application files. As discussed above, when a user creates or edits application file 204, the edits are applied to a corresponding temporary application file within either local storage 210 or removable storage device 212. Thus, in one embodiment, DLP agent 250 monitors temporary application files as well.

In one embodiment, DLP agent 250 opens a channel with file system driver 206, and instructs file system driver 206 to report operations performed by file system 208 to the DLP agent 250. In one embodiment, file system driver 206 reports the file system operations to file system connector 252. File system connector 252 informs policy violation detector 254 of the actions performed by file system 208.

In one embodiment, policy violation detector 254 is responsible for real-time monitoring of content within application file 204, and corresponding temporary application files. In one embodiment, policies utilized by policy violation detector 254 are supplied by the PMS 206. Policy violation detector 254 is further responsible for generating policy violation reports, and sending it to DMS 260 for transmission to an appropriate source, such as a network administrator, database, etc.

In one embodiment, when policy violation detector 254 detects a policy violation in a temporary application file, policy violation detector 254 stores the incident, and may thereafter correlate the policy violation with an original application file (e.g., a non-temporary application file) in a policy violation report. As will be discussed in greater detail, in one embodiment, policy violation detector 254 makes the correlation when policy violation detector 254 monitors a sequence of operations performed by file system 208.

In one embodiment, policy violation detector 254 may further instruct file system 208, utilizing the channel between file system connector 252 and file system driver 206, to perform remedial actions in response to detection of a policy violation. In one embodiment, where the policy violation is detected for a temporary file stored on removable storage 212, policy violation detector 254 instructs file system 208 to delete the temporary file. In one embodiment, where a temporary application file has been correlated with an original application file, policy violation detector 254 causes the renamed temporary application file (e.g., the original application file) to be deleted from the removable storage 212 after the rename operation. In another embodiment, policy violation detector 254 causes the temporary application file to be deleted immediately from the removable storage 212, and without waiting until the temporary application file has been correlated with application file 204. Any number and variety of policies may be supplied by a PMS (not shown), and acted upon by policy violation detector 254, and sent to DMS 260.

Figure 3:
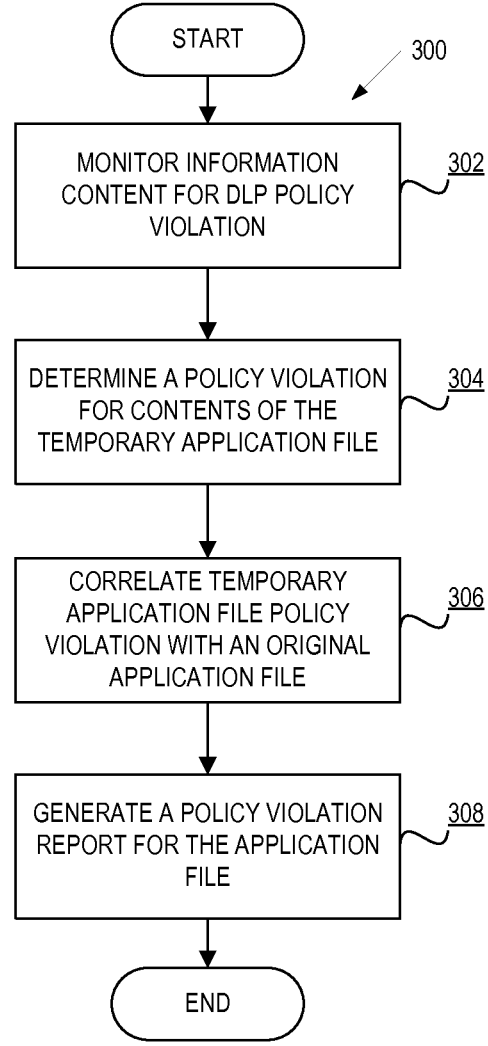
FIG. 3 is a flow diagram of one embodiment of a method for managing temporary file data loss prevention policy violations.

FIG. 3 is a flow diagram of one embodiment of a method 300 for managing temporary file data loss prevention policy violations. The method 300 is performed by processing logic that may comprise hardware (circuitry, dedicated logic, etc.), software (such as is run on a general purpose computer system or a dedicated machine), or a combination of both. In one embodiment, the method 300 is performed by a data loss prevention agent of a user endpoint device (e.g., DLP agent 250).

Referring to FIG. 3, processing logic begins by monitoring information content on a client for a data loss prevention (DLP) policy violation (processing block 302). As discussed above, the information content may include content of original application files and content of temporary application files, which are automatically created by office or productivity applications, such as word processing, spreadsheet, etc. applications, when an original application file is created or opened. Furthermore, the files are created with an automatically generated name, such as '~wrd387903.doc'. In one embodiment, processing logic monitors the information content in real-time.

Processing logic detects a policy violation and determines that the policy violation has occurred for content of a temporary application file (processing block 304). In one embodiment, processing logic determines if a policy violation has occurred according to one or more policies supplied by a policy management server, such as PMS 106 of FIG. 1. In one embodiment, as new user content is added to the temporary application file, or existing content is edited, corresponding modifications are made to the temporary application file by the application. In one embodiment, processing logic determines if the content, new or edited, violates a data loss prevention policy.

Processing logic correlates the temporary application file policy violation with an original application file (processing block 306). In one embodiment, and as discussed in greater detail below, processing logic utilizes monitored file system operations to correlate the policy violation with an original application file. In another embodiment, the correlation could be based on monitored function calls issued by an application. In yet another embodiment, the correlation could be based on a determination that a file is a temporary file, such as by detecting a file name that beings with '~' or '~tmp', and monitoring subsequent file system operations on the temporary file.

Processing logic then generates a policy violation report for the original application file (processing block 308). In one embodiment, because the temporary application file policy violation was correlated with an original application file, the original application file name (i.e., example_filename.doc) may be used in the resultant policy violation report, as opposed to the temporary application file name (i.e., ~wrd387903.doc'). By correlating and reporting the policy violation, using the original (non-temporary) application file name, the policy violation report is more precise (since users are usually not aware of the temporary file), simplifies database recording of policy reports, etc.

Figure 4:
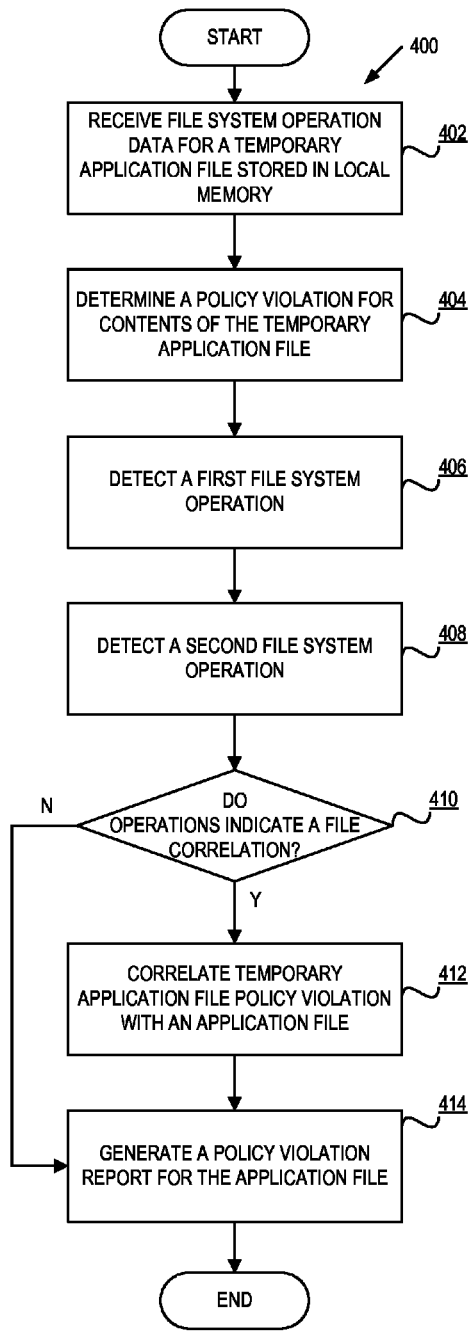
FIG. 4 is a flow diagram of one embodiment of a method for managing temporary file data loss prevention policy violations for temporary files stored in local memory of a user endpoint device.

FIG. 4 is a flow diagram of one embodiment of a method 400 for managing temporary file data loss prevention policy violations for temporary files stored in local memory of a user endpoint device. The method 400 is performed by processing logic that may comprise hardware (circuitry, dedicated logic, etc.), software (such as is run on a general purpose computer system or a dedicated machine), or a combination of both. In one embodiment, the method 400 is performed by a data loss prevention agent of a user endpoint device (e.g., DLP agent 250).

Referring to FIG. 4, processing logic begins with receiving data identifying file system operations for a temporary application file stored in local memory (processing block 402). In one embodiment, the temporary application file is located on a hard drive of a user endpoint device, such as local storage 210 of FIG. 1. Furthermore, as discussed above, the file system operation data may be received from a file system driver running on top of an operating system's file system. In one embodiment, processing logic receives data for all file system operations, such as file system read, undo open, close, rename, delete, etc. operations. Furthermore, in one embodiment, the file system driver informs processing logic that the file system operations are operations performed on a local memory.

Processing logic determines when a policy violation has occurred for contents of the temporary application file (processing block 404).

Processing logic detects a first file system operation and then detects a second file system operation (processing blocks 406 and 408). In one embodiment, processing logic detects the sequence of operations, where each operation in the sequence is a different operation. In one embodiment, the first operation is a close operation applied to the temporary application file, and the second operation is a rename operation to be performed on the closed temporary application file. For example, processing logic may determine that a file system is attempting to rename '~wrd387903.doc' to 'filename.doc'.

Processing logic then determines if the operations indicate a file correlation (processing block 410). As will be discussed in greater detail below, in one embodiment, processing logic utilizes properties of monitored file system operations to determine if a temporary application file may be correlated with a non-temporary application file.

When processing logic determines that a correlation does exist, processing logic correlates the temporary application file policy violation with a corresponding original application file (processing block 412), and generates a policy violation report for the original application file (processing block 414). As a result, a policy violation report is issued for 'filename.doc', even though the policy violation determination was made for ~wrd387903.doc'.

However, when processing logic determines that a correlation does not exist, processing logic generates a policy violation report for the temporary application file (processing block 414). In one embodiment, only the policy violation correlated with a non-temporary application file is reported. In another embodiment, all policy violations (e.g., violations which have been correlated, and violations associated with temporary application files) are reported. In this case, a policy reporting system is enabled to decide how to handle the policy violation reports, such as ignoring reports for files beginning with '~', '~tmp', etc.

Figure 5:
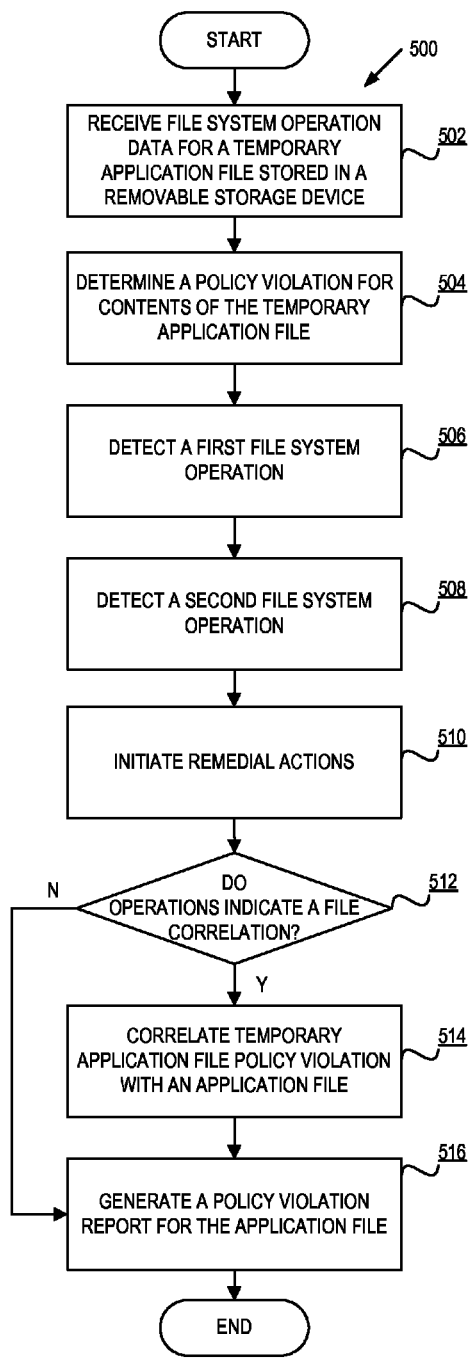
FIG. 5 is a flow diagram of one embodiment of a method for managing temporary file data loss prevention policy violations for temporary files stored in a removable storage device coupled with a user endpoint device.

FIG. 5 is a flow diagram of one embodiment of a method 500 for managing temporary file data loss prevention policy violations for temporary files stored in a removable storage device coupled with a user endpoint device. The method 500 is performed by processing logic that may comprise hardware (circuitry, dedicated logic, etc.), software (such as is run on a general purpose computer system or a dedicated machine), or a combination of both. In one embodiment, the method 500 is performed by a data loss prevention agent of a user endpoint device (e.g., DLP agent 250).

Referring to FIG. 5, processing logic begins by receiving file system operation data for a temporary application file stored in removable storage device (processing block 502). In one embodiment, processing logic receives an indication, from a file system driver, that the file system operations are being performed on a removable storage device. In one embodiment, the removable storage device is a flash memory device, universal serial bus (USB) flash drive, external hard disk drive, writeable compact disk, etc.

Processing logic determines a policy violation has occurred for contents of the temporary application file (processing block 504). Then, processing logic detects a first file system operation and then detects a second file system operation (processing blocks 506 and 508). As discussed above, in one embodiment, the file system operations may include a rename operation and a close operation.

Processing logic then initiates remedial actions (processing block 510). In one embodiment, processing logic marks the renamed temporary application file for deletion before the second operation is permitted to be executed by the file system, and causes the renamed temporary application file to be deleted after the second operation occurs. Processing logic causes the file to be deleted because of the nature of the storage device. That is, because the file is located on a removable storage device, and a policy violation has been detected, processing logic actively removes the policy-violating file from the removable storage device to ensure that the device is not subsequently disconnected and the sensitive data lost or stolen.

Processing logic then determines if the operations indicate a file correlation (processing block 512). As will be discussed in greater detail below, in one embodiment, processing logic utilizes properties of the monitored file system operations to determine if a temporary application file may be correlated with a non-temporary application file.

When processing logic determines that a correlation does exist, processing logic correlates the temporary application file policy violation with a corresponding application file (processing block 514), and generates a policy violation report for the application file (processing block 516). However, when processing logic determines that a correlation does not exist, processing logic generates a policy violation report for the temporary application file (processing block 518).

Figure 6:
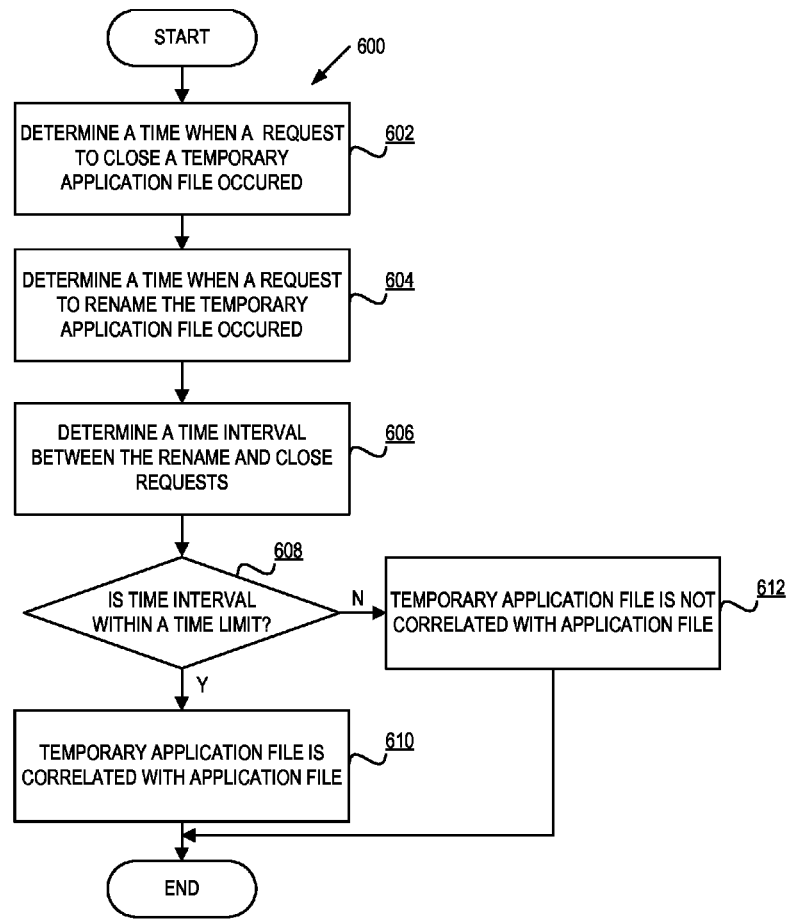
FIG. 6 is a flow diagram of one embodiment of a method for correlating a temporary application file with an original application file.

FIG. 6 is a flow diagram of one embodiment of a method 600 for correlating a temporary application file with an original application file. The method 600 is performed by processing logic that may comprise hardware (circuitry, dedicated logic, etc.), software (such as is run on a general purpose computer system or a dedicated machine), or a combination of both. In one embodiment, the method 600 is performed by a data loss prevention agent of a user endpoint device (e.g., DLP agent 250).

Referring to FIG. 6, processing logic begins by determining a time when a request to close a temporary application file occurred has occurred (processing block 604). Processing logic also determines a time when a request to rename the closed temporary application file occurred (processing block 602). In one embodiment, processing logic utilizes properties of monitored file system operations to determine if the temporary application file may be correlated with a non-temporary application file. In one embodiment, the file system operations times are utilized by processing logic for file correlation, and more particularly the time between a sequence of file system operations.

From the two times determined by processing logic, processing logic determines a time interval between the close and rename requests (processing block 606). In one embodiment, the temporary application file is first closed and then renamed. Thus, when the rename operation occurs, processing logic determine the elapsed time between the two operations by obtaining the last write time of the file and the current system time.

If processing logic determines that the time interval is within a time limit (processing block 608), processing logic correlates a temporary application file with a name for an application file (processing block 610). In one embodiment, the time limit is of a very short duration, such as 50-100 milliseconds. Because the time interval is set so short, processing logic is able to infer that the file system operations are the result of some computerized behavior, and not user actions. For example, when a user closes an application file, the application will cause a temporary application file to be closed and then renamed. The sequence of operations is automated by the application and will occur rapidly (e.g., within the 50-100 millisecond time limit). However, when a user manually renames a file, the rename operation may not be associated with a close operation, or the time between a manual user-renaming of a file and the file's closure will be beyond the time limit. Therefore, processing logic is able to determine when certain file system operations for temporary application files should be correlated with associated non-temporary application files.

However, if processing logic determines that the time interval is not within the time limit, processing logic does not correlate the temporary application file with a name for an application file.

Figure 7:
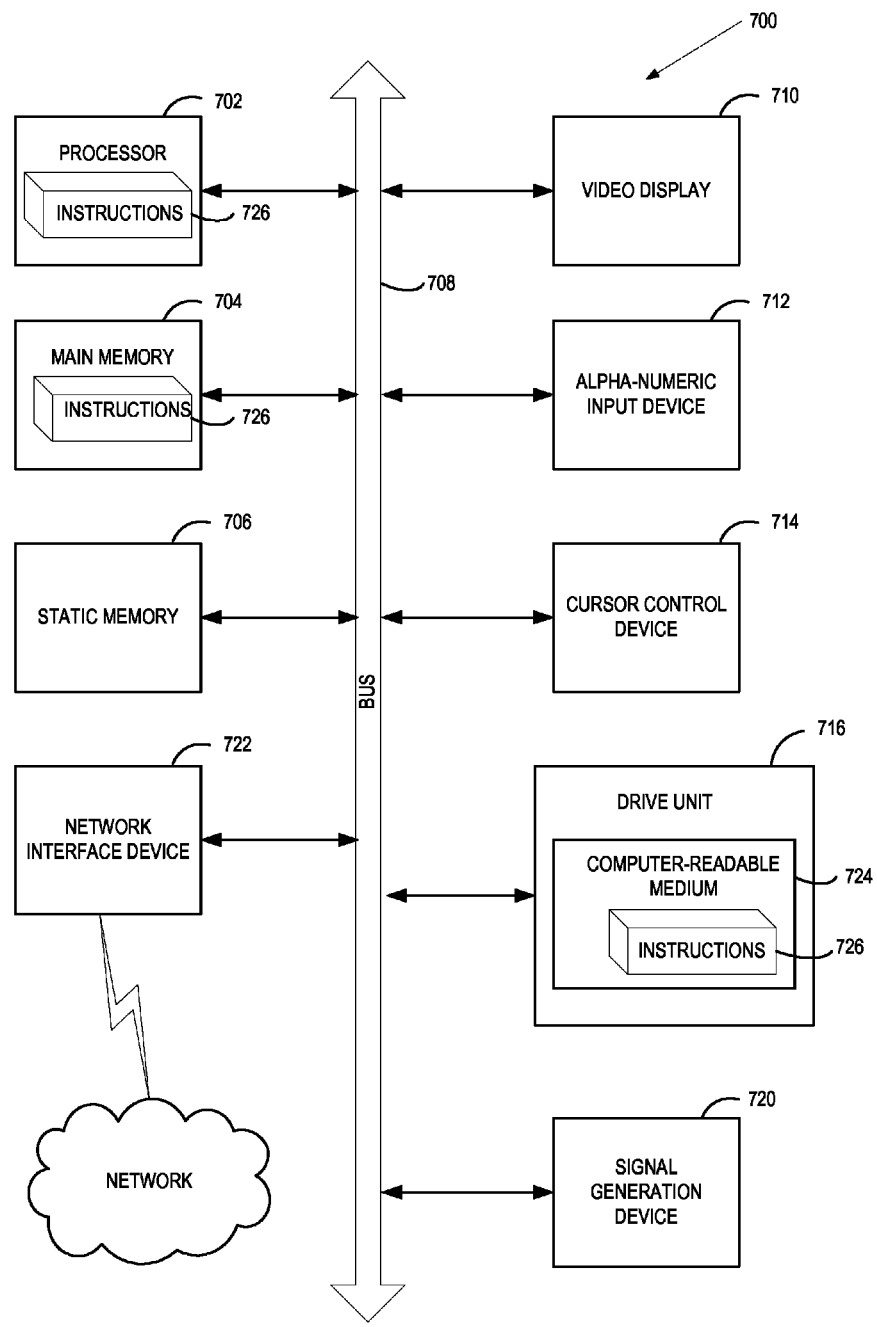
FIG. 7 illustrates a diagrammatic representation of a machine in the exemplary form of a computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-accessible storage media. The software 722 may further be transmitted or received over a network 720 via the network interface device 708.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A computer-implemented method comprising:
   monitoring, by a client agent, information content on a client for violations of a policy;
   determining, by the client agent, that a violation of the policy has occurred for content of a temporary file of an application, wherein the temporary file reflects an edited state of a corresponding original application file of the application;
   correlating, by the client agent, the policy violation of the temporary file with the original application file of the application; and
   reporting the policy violation with a name of the original application file, wherein correlating further comprises:
      monitoring file system operations for the temporary file;
      detecting that a first file system operation has occurred;
      detecting that a second file system operation has occurred subsequent to the first file system operation; and
      correlating the policy violation of the temporary file with the name of the original application file in response to detection of a sequence of the first and second file system operations.

2. The computer-implemented method of claim 1, wherein the reporting the policy violation comprises:
   generating a report for the policy violation of the temporary file using the name of the original application file; and
   sending the report to an entity.

3. The computer-implemented method of claim 2, further comprising:
   monitoring the file system operations performed by a file system with a file system driver; and
   reporting data indicating the monitored file system operations to a data loss prevention (DLP) agent of the client.

4. The computer-implemented method of claim 2, wherein the policy violation of the temporary file is correlated with the name of the original application file when the second file system operation occurs within a time limit relative to a time when the first file system operation occurs.

5. The computer-implemented method of claim 4, wherein the time limit is 50 milliseconds.

6. The computer-implemented method of claim 2, wherein the first file system operation is a close operation to close the temporary file, and the second operation is a rename operation to change a current name of the temporary file.

7. The computer-implemented method of claim 1, wherein the temporary file is a temporary copy of the original application file stored on a local storage medium of the client.

8. The computer-implemented method of claim 1, wherein the temporary file is a temporary copy of the original application file stored on a removable storage device coupled with the client.

9. The computer-implemented method of claim 1, wherein the temporary file is a temporary file for an application selected from the group consisting of a word processing application, a spreadsheet application, a presentation application, and a database application.

10. A computer readable storage medium that provides instructions, which when executed on a processing system cause the processing system to perform operations comprising:
    monitoring, by a client agent, information content on a client for violations of a policy;
    determining, by the client agent, that a violation of the policy has occurred for content of a temporary file of an application, wherein the temporary file reflects an edited state of a corresponding original application file of the application;
    correlating, by the client agent, the policy violation of the temporary file with the original application file of the application and
    reporting the policy violation with a name of the original application file, wherein correlating further comprises:
    monitoring file system operations for the temporary file;
    detecting that a first file system operation has occurred;
    detecting that a second file system operation has occurred subsequent to the first file system operation; and
    correlating the policy violation of the temporary file with the name of the original application file in response to detection of a sequence of file system operations that includes the first and second file system operations.

11. The computer readable storage medium of claim 10, wherein the reporting the policy violation comprises:
    generating a report for the policy violation of the temporary file using the name of the original application file; and
    sending the report to an entity.

12. The computer readable storage medium of claim 11, further comprising:
    monitoring the file system operations performed by a file system with a file system driver; and
    reporting the monitored file system operations to a data loss prevention (DLP) agent of the client.

13. The computer readable storage medium of claim 11, wherein the policy violation of the temporary file is correlated with the name of the original application file when the second file system operation occurs within a time limit relative to a time when the first file system operation occurs.

14. A client system comprising:
    a memory to store information content; and
    a processor coupled to the memory to cause a policy violation detector to monitor information content on the client system for violations of a policy, determine that a violation of the policy has occurred for content of a temporary file of an application, wherein the temporary file reflects an edited state of a corresponding original application file of the application, and wherein the policy violation monitor is to correlate the policy violation of the temporary file with the original application file of the application and report the policy violation with a name of the original application file, wherein the processor is configured to execute a file system driver to monitor file system operations performed by a file system and report the monitored file system operations to a file system connector of the client system, the file system connector to inform the policy violation detector of the file system operations performed on the temporary file, and the policy violation detector to detect that a first file system operation has occurred, detect that a second file system operation has occurred subsequent to the first file system operation, and correlate the policy violation of the temporary file with the name of the original application file in response to detection of a sequence of file system operations that includes the first and second file system operations.

15. The system of claim 14, wherein the policy violation detector is further to generate a report for the policy violation of the temporary file using the name of the original application file and to send the report to an entity.

16. The system of claim 14, wherein the temporary file is correlated with the name of the original application file by the detector when the second file system operation occurs within a time limit relative to a time when the first file system operation occurs.

* * * * *